Figure 1:
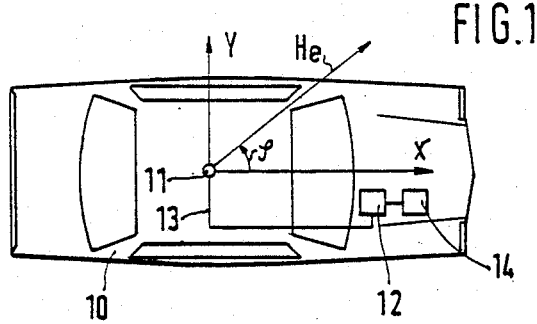

United States Patent [19]

Bauer et al.

[11] Patent Number: 4,733,179
[45] Date of Patent: Mar. 22, 1988

[54] METHOD OF DETERMINING AN INTERFERENCE-MAGNETIC FIELD IN A MOTOR VEHICLE PROVIDED WITH AN ELECTRONIC COMPASS

[75] Inventors: Harald Bauer, Nuremberg; Gerhard Hettich, Rosstal, both of Fed. Rep. of Germany

[73] Assignee: Robert Bosch GmbH, Stuttgart, Fed. Rep. of Germany

[21] Appl. No.: 763,143

[22] PCT Filed: Nov. 14, 1984

[86] PCT No.: PCT/DE84/00242
§ 371 Date: Jul. 31, 1985
§ 102(e) Date: Jul. 31, 1985

[87] PCT Pub. No.: WO85/02902
PCT Pub. Date: Jul. 4, 1985

[30] Foreign Application Priority Data

Dec. 17, 1983 [DE] Fed. Rep. of Germany ....... 3345818

[51] Int. Cl.$^4$ ................. G01R 33/02; G01C 17/38
[52] U.S. Cl. ........................................ 324/244; 33/356
[58] Field of Search ................. 324/244; 33/356, 361

[56] References Cited

U.S. PATENT DOCUMENTS 3,683,668  8/1972  Baker et al. ........................ 33/361
3,991,361  11/1976  Mattern et al. ..................... 324/244

FOREIGN PATENT DOCUMENTS 0041892  12/1960  France .
57-28208   2/1982  Japan .
58-161818  9/1983  Japan .

Primary Examiner—Reinhard J. Eisenzopf
Assistant Examiner—Walter E. Snow
Attorney, Agent, or Firm—Michael J. Striker

[57] ABSTRACT

To calibrate a electronic compass provided with a magnetometer and being fixedly mounted in a motor vehicle the magnitude, and direction of interference magnetic field must be determined. For this purpose, a constant magnetic field Hg containing an earth's field component He' and the interference field component Hs, is measured by the magnetometer in a first position of the vehicle (Hg1) and then in a second position (Hg2) in which the vehicle is turned by 180°. From the measured constant field magnitudes and directions, (Hg1, Hg2) the interference field component Hs is calculated according to vector equation $H_s + \frac{1}{2}$ (Hg 1 + Hg 2).

1 Claim, 4 Drawing Figures

METHOD OF DETERMINING AN INTERFERENCE-MAGNETIC FIELD IN A MOTOR VEHICLE PROVIDED WITH AN ELECTRONIC COMPASS

STATE OF THE ART

The invention relates to a method of calibrating an electronic compass for measuring magnetic fields in vehicles, the compass being provided with a magnetometer of the type in accordance with the main claim. For measuring planetary magnetic fields it is already known from DE-PS No. 16 23 577 to use a magnetometer with a time code. The magnetometer contains a probe with two horizontally disposed magnetiseable rod like cores which are penetrated by an alternating field and the component of the magnetic earth's field being in the direction of the rod axis. Furthermore, it is known to establish the X-component or the Y-component of the earth's field with respect to the longitudinal axis of the vehicle by means of two measuring coils which are offset with each other by 90° and to establish therefrom the size and direction of the applied magnetic field. However, the disadvantage exists that the earth's field to be determined superimposes with an interfering field generated in the vehicle, whereby the measuring accuracy can be considerably influenced. In navigation it is known to eliminate the interfering field directly on the compass, in that a counter directed field of the same strength is generated.

With the subject solution an effort is being made to determine an interfering field generated in the vehicle in accordance with size and direction measured with the compass, so that it can be considered as a correcting size for measuring the earth's field or for the further evaluation in the electronic compass.

ADVANTAGES OF THE INVENTION

The process in accordance with the invention and with the characterizing features of the main claim has the advantage that the size and the direction of a magnetic interference field in the motor vehicle is determined from two measurements of the size and direction of a constant magnetic field which already are to be made by the electronic compass. A further advantage consists in that no further measuring devices are required. Furthermore, it is possible in a simple manner to electronically store the measured values by actuating a standard calibration key in the two 180° deviating positions of the vehicle.

Advantageous further embodiments and improvements of the features stated in the main claim are possible by the measures stated in the subclaims. It is particularly advantageous when the vehicle in order to determine the interfering field is rotated by 360°. Thereby, the extreme values of the uniform field which are offset by 180° being measured by the magnetometer are picked up by a circuit and the interference field is determined in its size by arithmetic means from the two measured values, whereby the direction of the interference field is provided by the position of the maximum steady or constant field. The determined interference field of the vehicle is also stored in a storage as a correcting size by a previous actuating of a standard key and when determining the driving direction of the vehicle the interference field is subtracted from the constant field measured on the magnetometer in accordance with the size and the direction.

DRAWING

Figure 2:
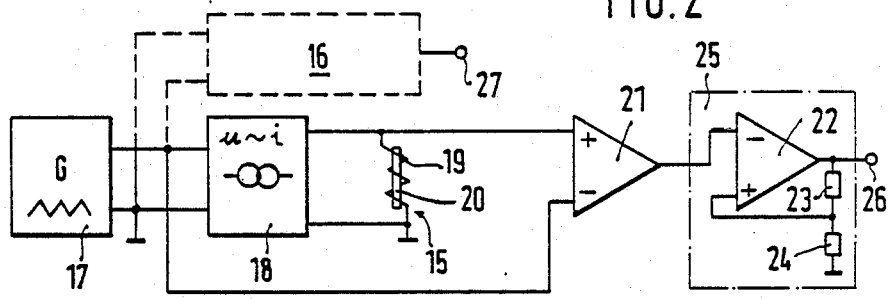
Figure 3:
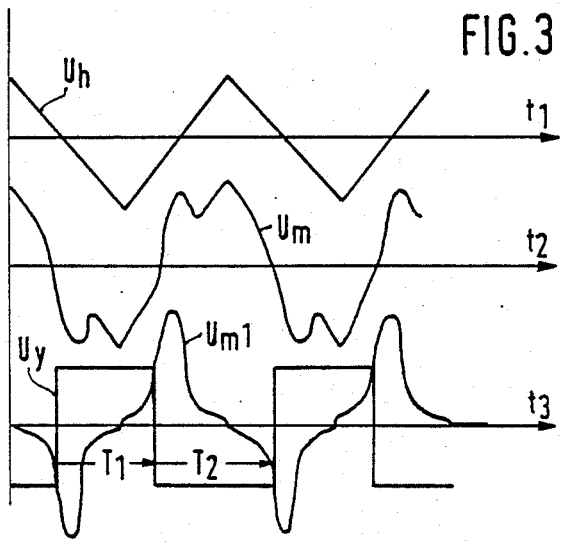
Figure 4:
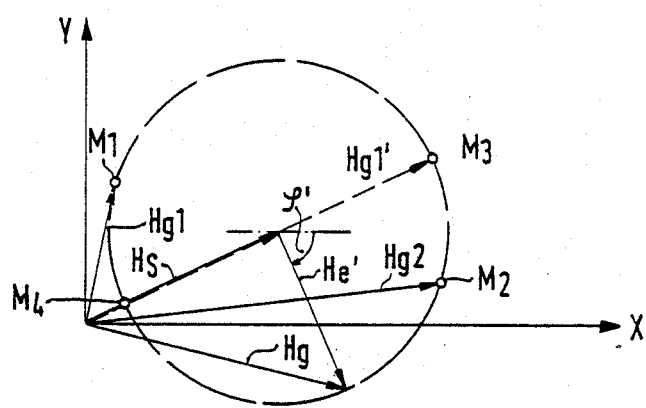

One exemplified embodiment of the invention is illustrated in the drawing and is explained in detail in the following description. The drawings show:

FIG. 1 a motor vehicle, wherein the drive direction is determined by measuring the magnetic earth's field by means of an electronic compass with a magnetometer, FIG. 2 the circuit of a magnetometer for measuring a magnetic field picked up by a probe, FIG. 3 the voltage path at different points of the circuit in accordance with FIG. 2, and FIG. 4 the vectors of the interference field, the earth's field and the constant field composed therefrom being picked up by the probe when calibrating the compass.

DESCRIPTION OF THE EXEMPLIFIED EMBODIMENT

A motor vehicle 10 is illustrated in plan view in FIG. 1. For determining the drive direction the motor vehicle 10 is provided with an electronic compass consisting of a magnetometer 11 and an evaluation circuit 12. The magnetometer 11 is disposed below the roof of the motor vehicle 10 at about the center of the vehicle or also below the rear window and is connected through a cable 13 with the evaluation circuit 12 being disposed in the cockpit of vehicle 10. The evaluation circuit 12 which is provided with a computer is connected to an optical indicator 14 which instantaneously shows the driver the momentary drive direction or the direction to be taken, if need be, so as to reach a previously put in destination. The magnetometer 11 serves for measuring the direction of the earth's field with respect to the longitudinal axis of the motor vehicle 10. For this purpose the magnetometer 11 is provided with two probes which are horizontally disposed and offset with respect to each other by 90°, one of which is illustrated in FIG. 2. One of the two probes is disposed on the X-axis and thereby in the longitudinal axis of the motor vehicle 10, while the other probe is disposed transversely in the direction of the Y-axis. The vector of the earth's field He forms together with the X-axis an angle $\alpha$. The X-component or the Y-component of the field He are measured in the two probes of the magnetometer 11 for determining this angle and the corresponding measuring values are fed to the evaluation circuit 12, wherein in a known manner the angle $\alpha$ is calculated by the computer and the drive direction or the deviation from the drive direction of the stated destination can be determined.

FIG. 2 illustrates the circuit structure of the magnetometer 11, whereby the circuit branch with the probe 15 being disposed in the direction of the Y-axis is illustrated in detail and is explained in detail in the following. The circuit branch for the probe being disposed in the direction of the X-axis is structured in the same manneer and is therefore illustrated in dotted lines and for simplicity sake is illustrated as a circuit block 16. Both circuit branches are supplied by a triangular generator 17 at the output of which an auxilliary alternate voltage Uh appears with an amplitude of 500 mV and a freqency of f=1 kHz, as illustrated in FIG. 3. The output of the triangular generator 17 is connected with the input of a voltage controlled current source 18, whereby one connection is applied on mass. The output of the current source 18 is connected to a winding 19 which is disposed on a high permeable, rodlike core 20 of probe 15. The winding 19 is also applied with one end to ground. The other end of winding 19 is applied to the plus input of a subtraction amplifier 21, whose minus input is connected with the non-grounded output of the triangular generator 17. The output of the subtraction amplifier 21 is connected with the input of a threshold value switch which consists of a Schmitt trigger 25 with switching thresholds which are symmetrical with respect to each other. The Schmitt trigger is formed by an operation amplifier 22, whose minus input is connected with the output of the sutraction amplifier 21 and whose plus input is connected with the tapping point of a voltage divider formed by the resistors 23 and 24 connected between the output of the operation amplifier 22 and the ground. The circuit block 16 contains for the nonillustrated probe which is disposed in the X-direction, a voltage controlled current source 18, a subtraction amplifier 21 and a Schmitt trigger 25 in a corresponding circuit. The outputs 26 and 27 of the circuit have to be connected through cable 13 with the evaluation circuit 12,14 (FIG. 1).

The mode of operation of the magnetometer 11 will now be explained in more detail with the assistance of the voltage curves illustrated in FIG. 3. The auxilliary alternate voltage Uh which appears on the output of the triangular generator 17 is illustrated on the time axis t1. It controls the current source 18 in such a manner that a corresponding triangular auxilliary alternate current occurs on the winding 19 which is connected to its output, which generates an auxilliary alternate field in the magnetiseable core 20 of probe 15. Due to this auxilliary alternating field the core 20 is magnetised until saturation in an alternate manner, i.e., in an alternating direction. Since the core 20 is also penetrated by the Y-component of the earth's field He (FIG. 1), both fields superimpose each other in core 20. Thereby, the Y-component of the earth's field He forms the magnetic field which is to be measured by the probe 15 and which penetrates the core 20 only in one direction and thereby brings core 20 earlier into saturation in one magnetisation direction, but delays the saturation in the opposite magnetisation direction. The magnetic field to be measured and the auxilliary alternating field being generated by the alternating current together generate with the applied voltage, which causes the magnetisation current, a measuring voltage Um on winding 19, which is illustrated on the time axis $t_2$ in FIG. 3. The auxilliary alternating voltage Uh of the triangular generator 17 is now subtracted by the subtraction amplifier 21 from the measuring voltage Um in such a manner that the illustrated amplified difference appears as a measuring voltage Um1 illustrated on the time axis $t_3$ in FIG. 3, at the output of the sutraction amplifier 21 and which corresponds to the voltage induced in the winding 19 by the total magnetisation field. The positive and negative halfwaves of the measuring voltage Um across the winding 19 or the amplified measuring voltage Um1 at the output of the subtraction amplifier 21 deviate from each other in dependency on the magnetic field to be measured. The dimension of the deviation is a measure for the dimension of the measured magnetic filed on probe 15 and consequently a measure for the Y-component of the earth's field He. For picking up this deviation of the positive and negative halfwaves, the amplified measuring voltage Um1 at the output of the subtraction amplifier 21 is applied to the input of the Schmitt-trigger 25. The generated rectangular output voltage Uy at the output 26 as illustrated on time axis t3 is fed to the evaluation circuit 12 (FIG. 1), whereby the scanning or duty ratio of the rectangular voltage, i.e., the time duration T1 of the positive amplitude to the time duration T2 of the negative amplitude represents a measure for the dimension of the Y-component of the earth's field He. The duty ratio T1 (T1 +T2) is determined by a computer, preferably a microcomputer of the evaluation circuit 12 and is further processed or stored.

The X-component of the earth's field He is determined in the same manner in the circuit block 16 and is fed through the output 27 in form of a pulse length modulated rectangular voltage with a duty ratio of the evaluating circuit 12 corresponding to the X-component of the earth's field (FIG. 1). When the earth's field to be determined is disposed exactly in the drive direction, that is, in the direction of the X-component or transversely thereto, that is, in direction of the Y-axis, a measurement of the magnetic field is taken only at one probe. The magnetic field component on the other probe is zero. Consequently, a measuring voltage with equal positive and negative halfwaves is generated and consequently the duty ratio of the associated output voltage Uy or Ux is equal to 50%.

The foregoing description of the exemplified embodiment is based on the assumption that no considerable interference field was superimposed on the earth's field He, which may be the case for motor vehicles with a plastic chassis and only a few iron parts. However, in the normal case an interference field is superimposed to the earth's field in the motor vehicle. The interference field is essentially caused by permanent magnetism in the sheet metal of the chassis an by the other iron parts of the vehicle and which could be in the order of magnitude of the earth's field. In order to eliminate this interference field during the operation of the electronic compass, a calibration must be performed in the vehicle after the compass had been installed. For this purpose the interference field is determined in the vehicle and the determined values are stored in a storage. During the operation of the electronic compass the values which are measured by the magnetometer are corrected with the stored values of the interference field.

With the assistance of FIG. 4 it will now be illustrated that an interference field measurement and interference field compensation in the electronic compass can be performed in a very simple and comfortable manner with the magnetometer 11, with the evaluation circuit 12 and the microcomputer contained therein. The coordination system already illustrated in FIG. 1 is used which is fixedly connected with the motor vehicle. Moreover, it is assumed that the motor vehicle is on a flat location. The constant field Hg which is measured by the two magnetic field probes is composed by the horizontal component He' of the earth's field He and the horizontal component of the interference field Hs in the motor vehicle. Thereby, $\phi'$ is the unknown angle of the earth's field He in drive direction, i.e., with respect to X-axis. The interference field Hs of the motor vehicle can be exactly determined by means of a simple calibration process in that in any given position of the motor vehicle the total constant field Hg1 which had been picked up by the magnetometer 11 is measured with a first measurement M1 and the measured X and Y values of this constant field are stored in the evaluation circuit 12 by actuating a calibration key. Thereafter, the motor vehicle is turned by exactly 180° and a second measurement M2 of the total constant field Hg2 is performed. With respect to the coordination system only the direction of the earth's field He changes due to the turning of the motor vehicle, whereby the interference field Hs of the motor vehicle remains unchanged both in magnitude and direction. Thereby the interference field Hs is obtained from the two measured values Hg1 and Hg2 of the constant field in accordance with the vector equation $$H_s = \tfrac{1}{2}(Hg1 + Hg2)$$

This calculation can be performed in a simple manner by the microcomputer of the evaluation circuit 12 in that it adds the X-components and the Y-components of the measured values M1 and M2 of the constant fields Hg1 and Hg2 and divides this sum by two. In this manner the X and Y-components of the interference field Hs are determined and stored as correction values and are subtracted therefrom at all further measurements.

FIG. 4 in furtherance illustrates that due to the turning of the motor vehicle around a vertical axis, the vector of the earth's field He rotates around the end point of the vector of the interference field Hs. The circle performed by the earth's field vector is shown in dashed lines. The angle $\phi'$ between the earth's field He and the drive direction of the motor vehicle results from the calculation being performed by the microcomputer of the evaluation circuit 12 in accordance with the equation $$\phi' = \arctan \frac{Hgy - Hsy}{Hgx - Hsx}$$

Thereby Hgy and Hsy are the Y-components of the constant field Hg and of the interference field Hs, while Hgx and Hsx are the X-components of these measuring values.

The measuring of the X and Y-components of the constant field by the electronic compass can be realized in a simple manner in that the two probes of the magnotometer 11 which are turned by about 90° with respect to each other are coupled alternatingly with a voltage controlled current source 18 and a subtraction amplifier 21 with series connected Schmitt-trigger 25. The measuring values which are fed through a measuring line must then be screened out in the evaluation circuit 12 at a corresponding time cycle.

What is claimed is:

1. A method of determining an interference magnetic field component in a motor vehicle provided with an electronic compass, the compass having a fixedly mounted magnometer consisting of two probes, each probe having a horizontally arranged rod-like core of magnetisable material, the cores in respective probes including an angle of 90° relative to each other and each supporting a winding, means for applying an alternating auxilliary voltage to said windings to alternately magnetize said cores up to saturation, said auxilliary voltage being combined with voltages induced in said windings due to a constant magnetic field composed of an earth's magnetic field component and an interference magnetic field component, said combined voltages producing an alternating measuring voltage, and means for evaluating the duty cycle ratio of positive and negative halfwaves of said measuring voltage, the method comprising the steps of measuring the magnitude and direction (Hg1) of the constant magnetic field in a first position of the vehicle, then measuring the magnitude and direction (Hg2) of the constant magnetic field in a second position in which the vehicle is turned around a vertical axis by 180°, then computing from the determined values (Hg1, Hg2) the magnitude of the interference field component (Hs) according to vector equation $$H_s = \tfrac{1}{2}(Hg1 + Hg2)$$

and storing the computed $H_s$ value for further processing.

* * * * *